United States Patent
Cho et al.

[11] Patent Number: 5,296,206
[45] Date of Patent: Mar. 22, 1994

[54] USING FLUE GAS ENERGY TO VAPORIZE AQUEOUS REDUCING AGENT FOR REDUCTION OF $NO_x$ IN FLUE GAS

[75] Inventors: Soung M. Cho, Parsippany; Andrew H. Seltzer, Livingston; Scot G. Pritchard, Somerville, all of N.J.

[73] Assignee: Foster Wheeler Energy Corporation, Clinton, N.J.

[21] Appl. No.: 923,718

[22] Filed: Jul. 31, 1992

[51] Int. Cl.$^5$ ............................ C01B 21/00; B01J 8/00
[52] U.S. Cl. ................................. 423/235; 423/239.1
[58] Field of Search .................. 423/235, 239, 235 D, 423/239 A

[56] References Cited

U.S. PATENT DOCUMENTS

| | | | |
|---|---|---|---|
| 3,897,539 | 7/1975 | Fleming | 423/235 |
| 3,900,554 | 8/1975 | Lyon | 423/235 |
| 4,314,345 | 2/1982 | Shiraishi et al. | 364/500 |
| 4,971,777 | 11/1990 | Firnhaber et al. | 423/235 |
| 5,020,457 | 6/1991 | Mathur et al. | 110/345 |
| 5,024,171 | 6/1991 | Krigmont et al. | 110/345 |
| 5,047,220 | 9/1991 | Polcer | 423/239 |
| 5,098,680 | 3/1992 | Fellows et al. | 423/235 |
| 5,237,939 | 8/1993 | Spokoyny et al. | 423/235 |

OTHER PUBLICATIONS

S. M. Cho, A. H. Seltzer, Z. Tetsui, "Design and Operating Experience of Selective Catalytic Reduction Systems for $NO_x$ Control in Gas Turbine Systems", Jun. 1991.

Primary Examiner—Gregory A. Heller
Attorney, Agent, or Firm—Marvin A. Naigur

[57] ABSTRACT

A method of vaporizing aqueous reducing agent for reducing $NO_x$ in flue gas in a combustion system. A heat exchanger is disposed in the flue gas path so that heat from the flue gas heats a heat transfer medium, preferably ambient air. The heated air is passed to a vaporizer vessel where it vaporizes an aqueous reducing agent, preferably aqueous ammonia. The vaporized ammonia is injected into the flue gas path where it is effective to reduce $NO_x$. Some aspects of an automatic control system are disclosed.

5 Claims, 1 Drawing Sheet

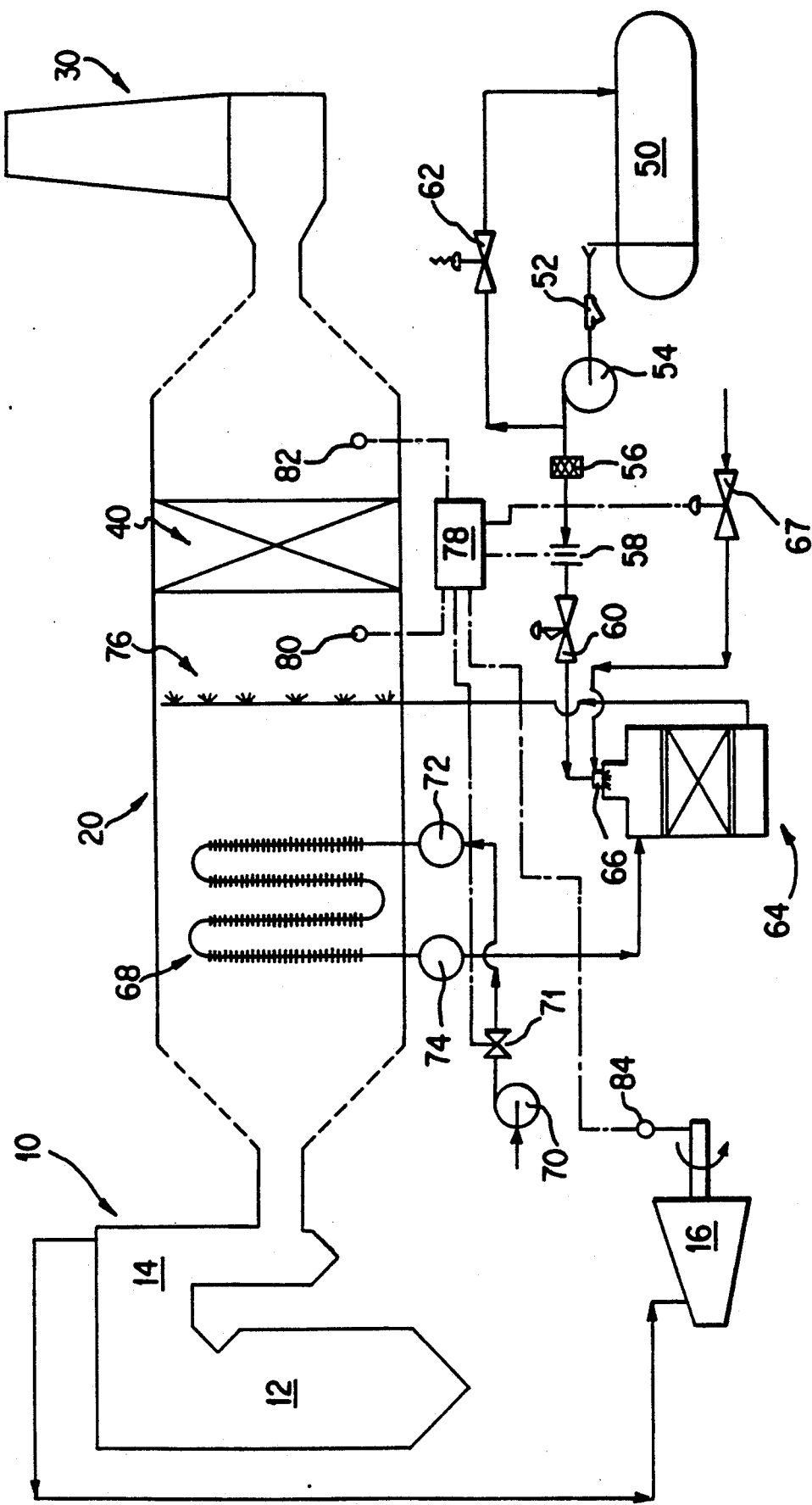

USING FLUE GAS ENERGY TO VAPORIZE AQUEOUS REDUCING AGENT FOR REDUCTION OF $NO_x$ IN FLUE GAS

BACKGROUND OF THE INVENTION

The combustion of fossil fuels such as coal, oil, industrial or natural gas produces environmentally hazardous substances including nitrogen oxide (NO) and nitrogen dioxide ($NO_2$). Nitrogen oxide and nitrogen dioxide are collectively called $NO_x$. In the normal combustion process of fossil fuel, the major portion of $NO_x$ is NO.

As is well known, the production of $NO_x$ can occur when fossil fuel is combusted in a variety of apparatus. Accordingly, the current invention may have application in process and refinery heaters, gas turbine systems, and boilers including steam plants. The fuel may include coal, oil, gas, waste product such as municipal solid waste, and a variety of other carbonaceous materials. The invention applies to apparatus having particle-laden flue gas and having so-called "clean" flue gas.

A number of $NO_x$ reducing agents are known. Ammonia is commonly used. A principal process for the removal of $NO_x$ from the flue gas stream is the injection of a reducing agent such as ammonia, urea, or any of a number of other known reducing agents. For example, a very common method is the selective catalytic reduction (SCR) of $NO_x$ involving the injection of ammonia ($NH_3$) into a flue gas and subsequent chemical reaction in the presence of catalyst; namely,

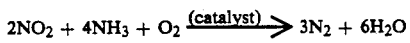

One traditional method of injecting ammonia into a flue gas stream uses an external ammonia vaporization system in which liquid ammonia, either in anhydrous or aqueous state, is first vaporized in a heater or vaporizer, mixed with air, and then routed to a distribution grid network for subsequent injection into the flue gas stream at a location upstream of an SCR reactor. A more detailed description of a known method and system for injecting anhydrous ammonia may be found in S. M. Cho, A. H. Seltzer, and Z. Tetsui, "Design and Operating Experience of Selective Catalytic Reduction Systems for $NO_x$ Control in Gas Turbine Systems," International Gas Turbine and Aeroengine Congress and Exposition at Orlando, Florida, Jun. 3-6, 1991 (ASME paper number 91-GT-26), hereafter called Cho et al. Because anhydrous ammonia is toxic and hazardous, the current "general" practice uses aqueous ammonia ($NH_3.H_2O$), which is a mixture of ammonia and water. Since ammonia is diluted with "benign" water, aqueous ammonia is less hazardous than anhydrous ammonia. A typical industrial grade aqueous ammonia contains approximately 30%. ammonia and 70% water. The ammonia-water mixture of the above percentages is safely transported on U.S. highways. It has a negligible vapor pressure at ordinary temperature.

Also known is a process that does not employ a catalyst, the so-called selective non-catalytic reduction (SNCR) process. Ammonia, urea, or other reducing agent is injected into the upper combustion area of a furnace or other combustor. Other injection sites are known, including the cyclone separator of a circulating fluidized bed steam generator.

In those systems and methods that use aqueous ammonia, there are several methods that are currently used to vaporize the ammonia. These include: (1) the use of an electric heater to heat ambient air and mix it with aqueous ammonia in a vessel, thus vaporizing the aqueous ammonia (described in Cho et al.), (2) the use of a kettle-type heat exchanger tank in which a tank filled with aqueous ammonia contains coils that are supplied with steam to vaporize the aqueous ammonia, (3) the use of an ammonia stripping tower in which aqueous ammonia is sprayed into the top of a fluid-fluid type contact tower and steam is introduced into the bottom, and (4) the use of a flue gas slip stream that is drawn by a blower into a vaporizer vessel where the flue gas mixes with and vaporizes aqueous ammonia.

SUMMARY OF THE INVENTION

The current invention provides a method of vaporizing aqueous reducing agent for the purpose of reducing $NO_x$ in flue gas that originates in a combustor in which the $NO_x$ is generated. The combustor is part of a combustion system defining a predetermined path along which the flue gas is carried to a stack. A heat exchanger is disposed in the flue gas path, typically in ducting, in such a way that the flue gas contacts a first functional side (e.g., the exterior of finned tubing) of the heat exchanger. A heat transfer medium, preferably ambient air, is passed in contact with a second functional side (e.g., the interior of finned tubing) of the heat exchanger such that the heat transfer medium is heated. The heated medium is then passed to a location outside the flue gas path where it is used to vaporize an aqueous solution of a reducing agent. Preferably, the vaporization is accomplished by intermixing the heated medium and the aqueous solution in a vessel, for example by spraying. Preferably, the reducing agent is ammonia. Finally, the vaporized aqueous solution is injected into the flue gas path where it is effective to reduce $NO_x$. (It is recognized that the vaporizer transforms an aqueous solution into something that no longer is an aqueous solution. However, for the sake of convenience, the mixture of reducing agent, air, steam, and any residual vapor is referred to as the "vaporized aqueous solution.")

The location at which the vaporized aqueous solution is injected into the flue gas path will vary with the nature of the combustion system. In a combustion system of the SNCR type, it may be preferable to inject the vaporized solution into the flue gas in the uppermost portion of the combustor. On the other hand, in SCR systems it is desirable to inject the vaporized solution an appropriate distance upstream of the catalytic reactor.

The invention is well suited for use with an automatic control system. The amount of reducing agent injected into the flue gas can be varied by passing the liquid aqueous solution through an automatically controlled valve. In the alternative, and preferably, the liquid aqueous solution flowrate is controlled via one or more "internal mix" air-atomizing nozzles. The pressure of the aqueous solution is held constant while the pressure of the atomizing air is varied. The variation of air pressure effectively regulates the flowrate of the liquid aqueous solution through the nozzle. The control of the valve can be accomplished by monitoring various process parameters that are chosen according to the nature of the combustion system in which the method is used.

DESCRIPTION OF THE DRAWING

The drawing is a schematic representation illustrating a preferred embodiment of the invention in a combustion system including a steam generator and a reactor for the selective catalytic reduction of $NO_x$.

DESCRIPTION OF THE PREFERRED EMBODIMENT

While this invention is susceptible of embodiment in many different forms, there is shown in the drawing and will herein be described in detail a preferred embodiment of the invention with the understanding that the present disclosure is to be considered as an example of the principles of the invention and is not intended to limit the broad aspect of the invention to the embodiment illustrated.

The drawing shows in schematic form an example of a combustion system of a type suitable for use in connection with the current invention. The combustion system includes a steam generator 10 including a combustor in the form of furnace 12 and heat recovery area 14. Steam lines lead from heat recovery area 14 to steam turbine 16. Flue gas is carried along a predetermined path from within the furnace 12, through the heat recovery area 14, then through a flue 20 leading to a stack 30. The combustion system includes a catalytic reactor 40 for the selective catalytic reduction (SCR) of $NO_x$. The SCR reactor 40 may be of a known type, such as a ceramic honeycomb embedded with catalyst. Such reactors are discussed further in Cho et al., cited above.

The combustion system shown in the drawing is illustrative only. Other types of combustion systems may benefit from the current invention. Examples are gas turbine heat recovery steam generators, process heaters, and circulating fluidized bed steam generators.

A tank 50 stores an aqueous solution of a reducing agent, preferably aqueous ammonia. An aqueous solution of ammonia may be stored at ordinary temperature.

The aqueous solution is drawn through strainer 52 by pump 54. From there, the solution passes through filter 56, flow meter 58, pressure regulator 60, and then to "internal mix" air-atomizing nozzle 66 of vaporizer vessel 64.

The vaporizer vessel 64 may be of any type that is effective to vaporize the aqueous solution in a manner to be described. The vaporizer vessel may be of a type described in Cho et al. In the alternative, and more preferably, the vessel has an air atomizing nozzle 66 and a shell packed with metallic pall rings.

Pressurized atomizing air is fed through automatic control valve 67 to air atomizing nozzle 66. Because nozzle 66 is an internal mix nozzle, the pressure of the atomizing air (as established by the setting of control valve 67) governs the flow rate of the reducing agent. The reducing agent pressure is held constant through action of the pressure regulating valve 60.

Vaporizer vessel 64 receives a heat transfer medium that has been heated in heat exchanger 68. Heat exchanger 68 is disposed in the path of the flue gas. In a known manner, heat exchanger 68 includes a first functional side that is contacted by the flue gas that gives up heat and a second functional side that is contacted by the heat exchange medium that receives heat. For example, the drawing shows a heat exchanger 68 made of finned tubing. The fins and the exterior of the tubing are on the first functional side of the heat exchanger in contact with the flue gas. The interior of the tubing is on the second functional side of the heat exchanger in contact with the heat exchange medium passing through the tubing. A single tube is shown connected to inlet header 72 and outlet header 74. In an actual system, a bank of such tubes may be connected to the inlet header 72 and outlet header 74. In the drawing, each tube makes four passes across flue 20 transverse to the direction of flow of the flue gas. Also, the inlet header 72 is illustrated as being downstream of the outlet header 74 with respect to the direction of flue gas flow. None of these characteristics of the heat exchanger 68 is critical. Variations may be made in accord with known design principles for heat exchangers. For example, the inlet and outlet headers 72, 74 may be disposed within the flue 20 should that prove more convenient. Inlet header 72 may be located upstream of outlet header 74 (with respect to the direction of flue gas flow). The fins may be omitted. The number or direction of passes may be varied.

The heat exchanger 68 itself advantageously may be made of typical carbon steel tubing. Depending on the application, the tubing may typically be of standard diameters ranging between about one half inch to four inches.

It is preferred that the heat exchange medium be air, most preferably ambient air. To this end, fan 70 draws ambient air from the general surroundings of the combustion system and forces it into inlet header 72 via control valve 71. An ambient temperature air blower such as fan 70 is cheaper and more readily available than a recirculation fan of a type that must handle hot flue gas. Also, such a fan can be expected to be more reliable.

In vaporizer vessel 64, the heated medium and aqueous solution are intermixed so as to vaporize the aqueous solution. To this end, the preferred embodiment typically will heat air in heat exchanger 68 to a temperature between about 400° F.–950° F. This temperature range only reflects typical operation, not a set of limits that must be maintained for technical reasons.

Also in the preferred embodiment, the heated air is introduced near the top of a vaporizer vessel of the type described above, where it is contacted by a spray of ammonia entering from the top. Typically, the pump 54 may establish a pressure of the ammonia of between about 10 psi and 200 psi. The aqueous ammonia flow rate depends upon the nature of the combustion system and the operating load. Typically, the flow rate may be about 3,000 lbs/hr or less.

The vaporized aqueous solution then passes to injection grid 76 of a known type, where it is injected into the flue gas path and allowed to reduce NO in the flue gas. Injection grid 76 may be located downstream of heat exchanger 68, as shown, or upstream of heat exchanger 68. For a catalytic system of the type shown (i.e., having an injection grid 76 located upstream of a catalytic reactor 40), the output of the vaporizer is preferably between 200° F.–800° F., more preferably between 250° F.–500° F.

The invention is well suited for use in connection with an automatic control system to regulate the degree of opening of valve 67 and hence the amount of ammonia or other reducing agent introduced into the flue gas. Automatic controller 78 preferably includes a digital processor. The output is used to regulate the opening of control valve 67. The controller 78 receives inputs from a number of sensors, the nature of which will vary with the nature of the combustion system and with user preference. The illustrated embodiment is suitable for use with a steam generator system used to drive a steam turbine for the generation of electricity and the like.

Such a system may employ a $NO_x$ analyzer system 82 downstream of the catalytic reactor 40, a temperature sensor 80 disposed for example between injection grid 76 and catalytic reactor 40, and a third sensor representing the flue gas flowrate. In a known manner, the flue gas flowrate is related to turbine load, which is measured as illustrated in the drawing at 84.

The base ammonia injection rate is set by feed-forward signals from 80 and 84, respectively representing flue gas flowrate and SCR flue gas inlet temperature. The base ammonia injection rate is continuously updated. Fine tuning of the ammonia injection rate is accomplished using the feedback signal from 82, measuring SCR outlet $NO_x$ concentration. The output of flow meter 58 is used to determine that the desired flowrate of ammonia is achieved.

There is described above an invention that is more economical than those described in the Background of the Invention, above. It consumes the least energy in operation. It is no more expensive to fabricate than some of the systems and is less expensive to fabricate than others. It is at least as reliable as some of the systems and more reliable than others.

In particular, by drawing thermal energy from the flue gas, the current invention avoids having to use electricity or process steam to vaporize the aqueous reducing agent. Even though it withdraws heat from the flue gas, the temperature drop of the flue gas across the heat exchanger is negligibly small (on the order of a few degrees for most applications), thereby causing no deleterious effect in the flue gas system. The current invention avoids the capital expense and additional maintenance cost of using further external equipment to heat the vaporizing medium. It further saves the extra capital and maintenance costs associated with a recirculating fan of the type designed to handle hot flue gas, instead allowing the uise of a standard ambient air fan.

What is claimed is:

1. A method of vaporizing aqueous reducing agent for reducing $NO_x$ in flue gas originating in a combustor in which the $NO_x$ is generated, the combustor being part of a combustion system defining a predetermined path along which the flue gas is carried to a vent at a downstream end of the flue gas path, the method comprising the steps of:
    providing a source of a reducing agent in aqueous solution, the reducing agent being of a type that is effective to reduce $NO_x$;
    disposing a heat exchanger in the flue gas path so that the flue gas contacts a first functional side of the heat exchanger;
    passing a heat transfer medium in contact with a second functional side of the heat exchanger such that the heat transfer medium is heated;
    passing the heated medium from the heat exchanger in the flue gas path to a location outside the flue gas path;
    using the heated medium to vaporize the said aqueous solution;
    injecting the vaporized aqueous solution into said flue gas path; and
    allowing the said vaporized solution to reduce $NO_x$ in the flue gas.

2. The method of claim 1, wherein said using step comprises the step of intermixing the heated medium and the aqueous solution in a vaporizer vessel, thereby vaporizing the aqueous solution.

3. The method of claim 1, wherein the heat transfer medium is ambient air.

4. The method of claim 1, wherein the reducing agent is ammonia.

5. The method of claim 1, comprising the further step of catalyzing the reduction of $NO_x$ by passing the mixture of flue gas and injected vaporized aqueous solution into contact with a catalytic reactor.

* * * * *